United States Patent Office 2,789,985

Patented Apr. 23, 1957

2,789,985

SUBSTITUTED BENZODIOXANES

Stuart A. Harrison, Minneapolis, Minn., assignor to General Mills, Inc., a corporation of Delaware No Drawing. Application March 28, 1955, Serial No. 497,399

5 Claims. (Cl. 260—340.3)

The present invention relates to substituted benzodioxanes having the following formula:

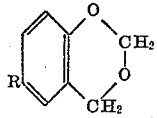

in which R is a hydrocarbon group containing from 1 to 10 carbon atoms. R may be either aliphatic or aromatic. These compounds are chemical intermediates suitable for the preparation of plasticizers, antioxidants, resins, bactericides, fungicides, etc.

It is, therefore, an object of the present invention to provide novel compounds having the above formula. It is another object of the invention to provide a novel process of producing such compounds.

The compounds of the present invention may be produced by reacting a para-substituted phenol, such as para-tertiary-butylphenol, at an elevated temperature, such as 160° C., in an autoclave with formaldehyde to produce the substituted benzodioxane as an oil. The benzodioxane may be recovered by vacuum distilling the reaction mixture to yield a distillate composed of water and an oil, the latter being composed of the desired product and a minor proportion of unreacted phenol.

Considerable variation is possible in the reaction by which the benzodioxane is produced. The temperature may be varied within the range of 120–230° C. At temperatures above about 230° C., the benzodioxane tends to decompose. The preferred temperature is about 140–160° C. The reaction time may be varied within the range of 20 minutes to 15 hours. Similarly, considerable variation is possible in the relative proportions of the substituted phenol and formaldehyde, as well as in the amount and type of acid catalyst employed. The yields obtained depend upon the reaction conditions employed, but in general, the above conditions are suitable.

*Example 1*

1200 grams of para-tertiary-butylphenol (8 mols), 650 g. of 37% formalin (8 mols), and 8 g. of oxalic acid were placed in a one gallon stainless steel autoclave equipped with stirrer. The autoclave was closed and the contents heated to 155–160° C. at a gauge pressure of 115 to 120 pounds per square inch for one hour. The autoclave was cooled to room temperature and then opened. The product was a mass of brittle porous resin, which was then heated under water pump vacuum to remove the water and a heavier-than-water oil. The oil amounted to 122 g. and consisted largely of 6-tertiary-butylbenzodioxane-1,3 containing smaller amounts of dissolved para-tertiary-butylphenol. The oil was vacuum distilled at 80–82° C. at 0.2 mm. to yield a purified material having the following physical and chemical properties: density $d_4^{20}$ 1.0560, index of refraction $n_D^{30}$ 1.5200, molecular wt. (ebullioscopic) 193 (theory=192), carbon and hydrogen analysis C=74.94%, H=8.14% (calculated for 6-t-butylbenzodioxane-1,3 $C_{12}H_{16}O_2$, C=74.96%, H=8.39%). The product had no appreciable hydroxyl number.

*Example 2*

A similar procedure was followed starting with p-cresol (450 g.—4.16 mols), formalin (338 g.—4.16 mols) and oxalic acid (3 g.). The reactants were heated for five hours at 150–158° C. and pressure of 115–118 pounds per square inch. The product after distillation crystallized on standing and was recrystallized from methanol, M. P.=40–41° C., molecular wt.=145–146 (theory for 6-methyl benzodioxane-1,3, 150), carbon and hydrogen analysis C=71.93, H=6.82 (theory for $C_9H_{10}O_2$, C=71.91%, H=6.71%).

*Example 3*

The following materials were heated for one-half hour in a one-gallon stainless steel stirred autoclave: p-t-butylphenol, 600 g. (4 mols); formalin (37% $CH_2O$) 650 g. (8 mols) and oxalic acid, 8 g. The reaction temperature was from 146–155° C. Considerable formaldehyde remained unreacted at the end. Stripping gave 544 g. of resin and 90 g. of the crude oil. The oil was similar to that obtained in the other examples.

In place of the para-tertiary-butylphenol and the cresol described in the specific examples, other para-substituted phenols having a hydrocarbon substituent of from 1 to 10 carbon atoms may be employed. Typical of these phenols are para-nonylphenol, para-isopropylphenol, para-tertiary-amylphenol, para-cumylphenol, and para-phenylphenol. These substituted phenols can be used in the examples specifically described above to produce the corresponding substituted benzodioxane-1,3.

These substituted benzodioxanes are particularly useful in the modification of conjugated drying oils such as China-wood oil, oiticia oil and perilla oil. While these oils are excellent varnish oils in that they have fast drying rates, in their unmodified condition, they dry to a wrinkled or frosty condition. By heating these conjugated oils at 200 to 250° C. and from 30 to 60 minutes with from 5 to 40% of the substituted benzodioxanes of the present invention, the conjugated oils are modified so as to eliminate the frosty or wrinkled appearance of films prepared from them and also it is possible to provide a means of controlling the tendency of these oils to gel in the varnishing material.

The substituted benzodioxanes are also useful in the preparation of plasticizers. Thus 6-t-butyl benzodioxane 1,3 was heated at 220 to 230° C. in an excess of ethyl maleate. The weight ratio of substituted benzodioxane to maleate was 1 to 3. The mixture was heated for 16 hours, then distilled to separate excess ethyl maleate and product. The product boiled at 140 to 142° C. at 0.15 mm. The following reaction is postulated. The substituted benzodioxane decomposes at 220 to 230° C. to give an ortho-methylene quinone which is unstable and undergoes a Diel's-Adler reaction with an active dienophile such as ethyl maleate.

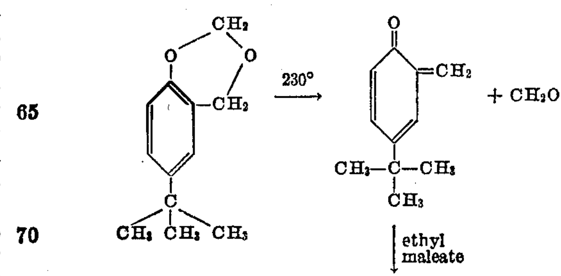

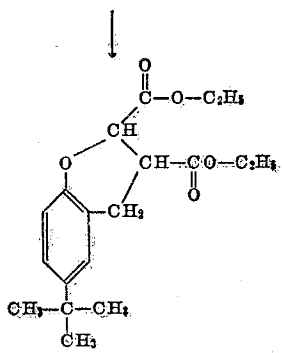

Analytical values of carbon and hydrogen for the final product are in agreement with the theoretical values for the final compound shown above.

Ten parts of the final product plus 5 parts of 2 ethyl hexyl tetrahydro phthalate were mixed with 20 parts of a vinyl chloride-vinyl acetate copolymer (Vinylite VYNW) and milled on a hot mill to produce a plasticized sheet.

The present application is a continuation-in-part of my copending application Serial No. 262,499 filed December 19, 1951, now abandoned.

I claim as my invention:

1. Process of producing compounds having the following formula:

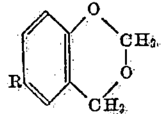

in which R is a hydrocarbon group containing from 1 to 10 carbon atoms, which comprises reacting a phenol having a hydrocarbon group containing from 1 to 10 carbon atoms in the para position selected from the group consisting of alkyl and aryl radicals, with formaldehyde at a temperature of from 120–230° C. for from 20 minutes to 15 hours, in the presence of an acid catalyst, and recovering the benzodioxane thus formed.

2. Process of producing 6-tertiary-butylbenzodioxane-1,3, which comprises reacting p-tert-butylphenol with formaldehyde at a temperature of from 120–230° C. for from 20 minutes to 15 hours, in the presence of an acid catalyst, and recovering the benzodioxane thus formed.

3. Process of producing 6-methyl-benzodioxane-1,3, which comprises reacting p-cresol with formaldehyde at a temperature of from 120–230° C. for from 20 minutes to 15 hours, in the presence of an acid catalyst, and recovering the benzodioxane thus formed.

4. Process of producing 6-tertiary-butylbenzodioxane-1,3, which comprises reacting p-tert-butylphenol with formaldehyde at a temperature of from 140–160° C. for from 20 minutes to 15 hours, in the presence of an acid catalyst, and recovering the benzodioxane thus formed.

5. Process of producing 6-methyl-benzodioxane-1,3, which comprises reacting p-cresol with formaldehyde at a temperature of from 140–160° C. for from 20 minutes to 15 hours, in the presence of an acid catalyst, and recovering the benzodioxane thus formed.

References Cited in the file of this patent

UNITED STATES PATENTS

| | | |
|---|---|---|
| 1,807,729 | Brunner | June 2, 1931 |
| 2,356,683 | Mikeska et al. | Aug. 22, 1944 |
| 2,417,548 | Engel | Mar. 18, 1947 |

OTHER REFERENCES

Borsche et al.: Annalen, vol. 330, pp. 83–91, 96.

Chattaway et al.: Anales Soc. Espan. fis. quim., vol. 26, pp. 75–86 (1928).